Sept. 16, 1969    D. J. MARLEY    3,467,451

RESILIENTLY MOUNTED BEARING ARRANGEMENTS

Filed Aug. 29, 1966

INVENTOR.
DAVID J. MARLEY
BY Fraser and Bogucki

ATTORNEYS

United States Patent Office 3,467,451
Patented Sept. 16, 1969

3,467,451
RESILIENTLY MOUNTED BEARING ARRANGEMENTS
David John Marley, Buena Park, Calif., assignor to The Garrett Corporation, Los Angeles, Calif., a corporation of California
Filed Aug. 29, 1966, Ser. No. 575,666
Int. Cl. F16c 27/00, 35/00, 1/24
U.S. Cl. 308—26
12 Claims

ABSTRACT OF THE DISCLOSURE

A bearing is provided in which a spring assembly circumferentially disposed between a generally circular bearing element and the wall of a housing aperture presents non-linear resiliency to the bearing element in a radial direction to improve the stability of the bearing. The bearing element extends about a rotating shaft and may comprise either a bushing or the outer race of a ball bearing. Axial movement of the bearing components may be limited by mounting retaining rings within the housing aperture wall, and the spring assembly preferably comprises an integral strip of resilient material having groups of slots which define outwardly extending resilient elements when the strip is caused to assume a cylindrical configuration.

---

This invention relates to rotary bearing and more particularly to bearings having resilient mountings.

In the design and development of bearings for supporting elements rotating at extremely high speeds, particular problems relating to resonant vibrations are encountered. Among the types of bearings employed for this purpose are fluid film lubricated bearings and ball bearings. In fluid film lubricated bearings, the respective bearing surfaces are supported for relative movement by an intervening lubricating fluid film which may be either a liquid or a gas. Gaseous films, such as air by way of example, have proven to be particularly effective at extremely high speeds of rotation. Included in the group of fluid film lubricated bearings are externally pressurized bearings, commonly referred to as hydrostatic bearings, and self-acting or self-pressurizing bearings, commonly referred to as hydrodynamic bearings. Hydrostatic bearings receive a constant flow of lubricant under pressure from an external lubricant source which generates the required lubricating film pressure in the bearing. In hydrodynamic bearings, on the other hand, the required lubricating film pressure is generated by the relative movement of the bearing surfaces. Hydrodynamic bearings, however, may be supplied with a constant flow of lubricant from an external source to maintain a sufficient quantity of lubricant in the bearing or to cool the bearing.

Various fluid film lubricated bearings are presently available. Unfortunately, however, while existing bearings are satisfactory for some applications, they possess certain inherent deficiencies which detract from their usefulness, particularly with ultra-high speed rotary machinery. One of the most serious problems is hydrodynamic instability within various speed ranges. During the initial acceleration of a shaft or other rotatable member supported by the bearing, the shaft tends to rotate about its geometric axis. However, as higher speeds are reached, centrifugal forces are exerted on eccentricities in the shaft mass causing the shaft to orbit or whirl in the bearing at synchronous speed, that is, at a rotational speed equal to the rotational speed of the shaft on its axis. This orbiting or whirling motion is commonly referred to as synchronous whirl. The amplitude of the synchronous whirl increases as the shaft speed approaches a lowest critical speed. In some fluid film lubricated bearings, the amplitude of synchronous whirl at the lowest critical speed is of sufficient magnitude to limit the usefulness of the bearings to a speed range well below the lowest critical speed. However, in most bearings, no damage is incurred due to the synchronous whirl because of the relative low speeds involved, particularly if this lowest critical speed is passed through rapidly. Thus, even in cases where the orbiting amplitude of synchronous whirl becomes great enough to cause actual physical contact between the shaft and the bearing, damage is usually very slight, if any.

Once the lowest critical speed is exceeded, the shaft tends to rotate on its mass axis so that synchronous whirl instability does not pose any further problem. As the shaft speed continues to increase, however, the bearings exhibit a much more serious form of instability as the shaft approaches a speed approximately twice the lowest critical speed. This instability is known by various names but is most commonly referred to as half-frequency or half-speed whirl instability. Half-speed whirl instability results from the fact that as the shaft approaches a speed approximately twice the lowest critical speed, it inherently tends to undergo harmonic vibration or whirl at a multiple of its lowest critical frequency. This harmonic vibration which is superimposed on the synchronous shaft whirl is contributed to by the rotation of the fluid film at half the speed of the rotating mechanical element, which rotational velocity then approaches the lowest critical frequency. As a result excursions of the shaft rapidly increases in amplitude and the shaft may approach the bearing walls. The end result may be actual physical contact of the rotating shaft with the bearing which usually results in bearing failure because of the relatively high speeds involved. In such bearings the upper rotational limit is the critical frequency at which half-speed whirl instability is encountered.

Although instabilities contributed by fluid films of hydrostatic or hydrodynamic bearings may not be a factor in ball bearings or the like, these last-mentioned bearings are also subject to synchronous whirl and half-speed whirl resulting from eccentricities in the rotating elements and harmonic vibration and therefore are subject to similar problems described above for fluid film lubricated bearings.

Various bearing configurations have been proposed in the past to reduce half-speed whirl instability and to increase the maximum safe shaft speed. While some of these bearing configurations have been successful to a limited extent, they are in general complex, costly to make, and at best do not permit high enough shaft speeds to make them useful for many applications.

Accordingly, it is an object of the present invention to provide an improved bearing which advantageously minimizes or eliminates undesirable whirl instability within a relatively wide range of operating speeds.

It is a more specific object of the present invention to provide a resiliently mounted bearing structure having improved stability for high speed operation.

In accordance with an aspect thereof, it is a particular object of the present invention to provide a resilient mounting for a bearing structure which may be inexpensively fabricated from a variety of materials.

These and other objects are accomplished in accordance with the present invention by providing a shaft bearing arrangement wherein a resilient mounting surrounding and supporting a shaft-receiving element advantageously provides non-linear resiliency to effectively damp and absorb the amplitude of eccentric shaft motion during conditions of whirl instability.

In a particular embodiment in accordance with the present invention, a fluid film (preferably a gas film, such as air) lubricated journal bearing is provided. The bearing includes a housing having an aperture extending therethrough to receive a rotatable shaft. A hollow, cylindrically shaped bushing is disposed about the shaft within the housing aperture, and a resilient mounting in the form of a spring assembly is disposed about the shaft between the bushing and the walls of the housing aperture. The spring assembly, preferably fabricated from flat strip stock, is positioned in a generally cylindrical configuration. The spring assembly includes a plurality of resilient elements which extend at least part of the radial distance between the outside of the bushing and the walls of the housing aperture. The generally cylindrical portion of the spring assembly is relatively flexible and the resilient elements in conjunction therewith provide a non-linear spring or resilient characteristic between the bushing and the aperture walls. At relatively low speeds the stiffness of the gas film between the bushing and the rotating shaft is considerably less than the stiffness of the resilient mounting, and the system behaves as if the bushing were rigidly mounted. Stability at low speeds can be determined by treating the rotor as an oscillating body suspended on springs equal to the stiffness of the gas film. At relatively high speeds, however, the stiffness of the gas film between the bushing and the rotating shaft becomes considerably greater than the stiffness of the resilient mounting, which may be ignored. Stability of the system at high speed may be determined by treating the mass of the bushing as the oscillating body, suspended on the gas film which acts as linear springs. In addition, the bearing attitude angle at high speeds is very low, a condition which is also very conducive to bearing stability.

In the described arrangement of a fluid film bearing, the bushing is not restrained from rotating and in particular applications it usually turns very slowly in the direction of shaft rotation, typically one revolution per minute (r.p.m.) for a one-inch diameter bushing at a shaft speed of 100,000 r.p.m. If torque between shaft and bushing exceeds the torque between the bushing and the resilient mounting, the bushing may spin at high speed, typically approximately half the shaft speed, and form a second gas film between the spring mount and the bushing. Such an arrangement provides improved resiliency and added protection to the bearing under momentary transverse overloads and further reduces the effects of bearing instabilities.

In another particular arrangement in accordance with the invention, a ball bearing structure is provided in which a resilient mounting in the form of a spring assembly such as that described above is positioned between the bearing housing and the outer race of the bearing. Improved stability is achieved for such an arrangement by virtue of the non-linear spring rate of the resilient spring assembly which increases as the ball bearing moves eccentrically in the housing. The resilient mounting advantageously provides a larger amount of friction damping. Both the non-linear spring rate and the friction damping reduce the amplitude of shaft-bearing motion at the resonant frequencies and increase the dynamic load capacity of the bearing.

In accordance with a particular aspect of the invention the spring assembly may be fabricated from an integral piece of resilient material, such as metal, by stamping to form the desired configuration. In certain particular configurations, groups of elongated slots disposed about the circumference of the cylindrical configuration define a plurality of tab-like elements which extend from the cylindrical configuration substantially within planes tangent to the configuration to provide a compressible arrangement of non-linear resiliency. In another particular configuration the spring assembly may comprise a strip to which a plurality of regularly spaced, substantially flat segments are attached, as by spot welding. The desired resilient mounting results when the strip is placed circumferentially about the inner bearing element.

The novel features of this invention, as well as the invention itself, both as to its organization and mode of operation, may best be understood when considered in the light of the following description, taken in conjunction with the accompanying drawing, in which.

Figure 1:
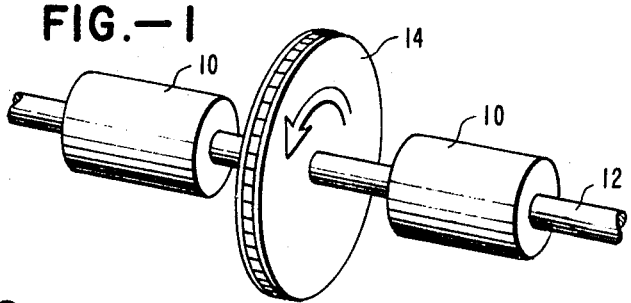
FIG. 1 is a diagrammatic representation showing the utilization of the invention.
Figure 2:
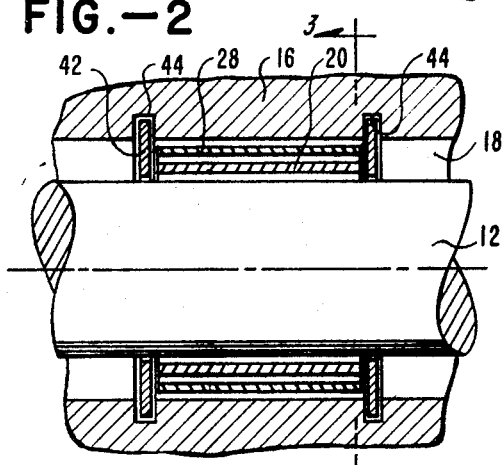
FIG. 2 is a cross-sectional view of a particular arrangement of a journal bearing in accordance with the invention.
Figure 3:
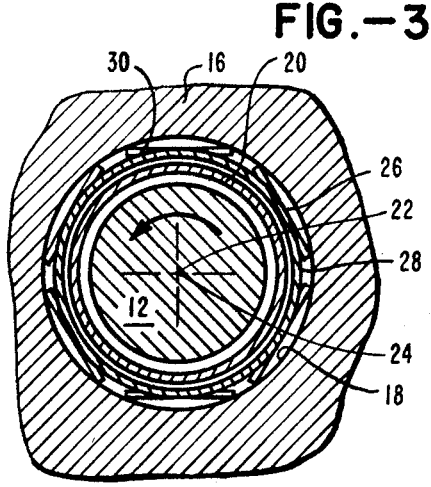
FIG. 3 is an end-sectional view of the journal bearing of FIG. 2, taken along the line 3—3.

FIG. 1 represents a typical bearing-shaft arrangement including bearing 10 encompassing a rotatable shaft 12 which is shown coupled to a turbine wheel 14 as an example only. FIGS. 2 and 3 illustrate one particular embodiment of bearing structures in accordance with the invention which may be used as the bearings 10 in FIG. 1.

As illustrated in FIGS. 2 and 3, the bearing 10 includes a housing 16 having an aperture 18 of uniform, circular cross-section extending therethrough. The rotatable shaft 12 has at least one axial portion thereof of uniform circular cross-section disposed within the housing aperture 18. While the diameter of the rotatable shaft 12 is less than the diameter of the aperture 18, the relative differences therebetween are shown in greatly exaggerated form for purposes of clarity. In actual bearings in accordance with the invention the diameters of the rotatable shaft 12 and the aperture 18 would differ only in the order of several hundredths of an inch in a typical case.

In the arrangement depicted in FIGS. 2 and 3 a hollow cylindrical bushing 20 is shown disposed around the rotatable shaft 12 and within the aperture 18. The bushing 20 has a generally uniform length in the direction of the central axis thereof and a substantially uniform thickness in all directions perpendicular to the central axis. The bushing 20, which is considerably lighter in weight than the rotatable shaft 12, may be made of any appropriate resilient durable material and may be either rigid or flexible for purposes of the present invention. A carbon graphite material molded with a binder is preferred. The inner diameter of the bushing 20 is larger than the diameter of the rotatable shaft 12, while the outer diameter of the bushing is smaller than the diameter of the aperture 18.

A spring assembly 26 is disposed about the rotatable shaft 12 between the bushing 20 and the walls of the aperture 18. The spring assembly 26, which is positioned in a generally cylindrical configuration, has a length in the direction of the central axis thereof approximately equal to the axial length of the bushing 20. The spring assembly 26 is preferably comprised of an integral piece of relatively thin, resilient metal such as steel and includes a base portion 28 of generally cylindrical configuration and a plurality of resilient elements 30 which extend outwardly from the base portion within planes tangent to the base portion. The resilient elements 30 extend outwardly from the base portion 28 through at least a part of the radial distance between the bushing 20 and the walls of the aperture 18 to provide non-linear resiliency therebetween. With the base portion 28 concentrically disposed relative to the bushing 20 and the aperture 18, the resilient elements 30 are in contact with the walls of the aperture and a uniform radial distance exists between the base portion and the bushing.

Figure 4:
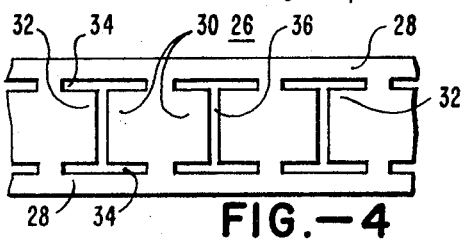
FIG. 4 is a plan view of one particular configuration of a spring assembly in accordance with the present invention.
Figure 5:
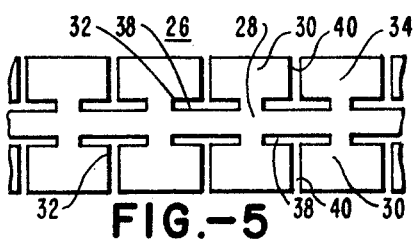
FIG. 5 is a plan view of another configuration of a spring assembly in accordance with the present invention.
Figure 6:
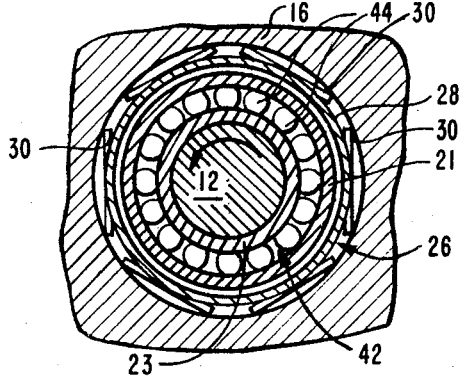
FIG. 6 is a plan view of still another configuration of a spring assembly in accordance with the present invention.

The details of the spring assembly 26 may be better understood by reference to FIGS. 4, 5 and 6 which illustrate alternative configurations of the assembly. In the configuration of FIGS. 4 and 5 the spring assembly 26 is shown consisting of an integral piece of elongated metal having a uniform width in a direction perpendicular to the axis of elongation and having groups of elongated slots 32 equidistantly disposed along the length thereof.

In the arrangement of FIG. 4 each slot group 32 includes a pair of slots 34 of substantially equal length disposed parallel to the axis of elongation of the sheet of metal. A third slot 36 is disposed normal to and intersecting the slots 34 at their midpoints. With the opposite ends of the elongated piece of metal drawn together to form a generally cylindrical configuration, the tab-like members defined by the slots 34 and 36 extend outwardly and define the resilient elements 30. The slots 34 are axially displaced from one another relative to the central axis of the cylindrical configuration and the slot 36 extends in a direction parallel to the central axis of the configuration. The resilient elements 30 formed by the slots accordingly lie substantially within planes tangent to the cylindrical configuration, and the base portion 28 is defined by those portions between the opposite edges and the slots 34.

In an alternative spring assembly configuration illustrated in FIG. 5, each slot group 32 includes a first pair of slots 38 disposed parallel to the axis of elongation of the elongated piece of metal and a second pair of slots 40 extending inwardly from the opposite edges along a common axis and intersecting respective ones of the slots 38 at the mid-point thereof. With the opposite ends of the arrangement of FIG. 5 drawn together to form a generally cylindrical configuration, the base portion 28 is defined by those portions between the slots 38. The first pair of slots 38 are axially displaced relative to the central axis of the cylindrical configuration while the second pair of slots 40 extend along a common axis parallel to the central axis of the configuration. A plurality of tab-like members defined by the slots 38 and 40 extend outwardly from the cylindrical configuration and define the resilient elements 30.

The arrangements illustrated in FIGS. 4 and 5 are presented only by way of example, and it should be understood that other spring assembly configurations are possible. A single piece of spring material provided with cutouts in the manner shown and described acts like a plurality of individual springs, equally spaced about the bushing. Several spring strips of different thickness or metallurgical composition may be used in place of a single spring strip to provide any desired non-linear spring mounting characteristic.

One such other configuration is shown in FIG. 6 as comprising a plurality of segments constituting the resilient elements 30 affixed to a base strip 28 which may be positioned as the spring assembly 26 within the bearing 10. As shown in FIG. 6, each individual resilient element 30 is spot welded to the base strip 28 along a line substantially centered on the individual segment and extending transversely to the base strip 28. As the spring assembly 26 is positioned around the bushing 20, for example, it is preferred that the side of the strip 28 bearing the elements 30 be radially outermost. Thus the elements 30 form a plurality of tangential, substantially planar segments extending outwardly to bear against the inner surface 18 of the housing 16, thereby developing the desired radially inward spring force to support the bearing element, such as 20.

Depending upon the design of the bearing 10 it may be desirable for some applications to provide a means for retaining the bushing 20 and the spring assembly 26 in place within the housing aperture 18. This may be accomplished by a pair of retaining rings 42 disposed at opposite ends of the bushing and spring assembly. The rings 42 generally have an internal diameter larger than than the diameter of the rotatable shaft 12 but smaller than the outside diameter of the bushing 20, and an external diameter larger than the diameter of the housing aperture 18. Accordingly, the rings 42 reside within recesses 44 disposed within the walls of the housing aperture 18. With the retaining rings 42 in place, the bushing 20 and spring assembly 22 are restrained against any tendency to move in an axial direction partly or completely out of the bearing 10. When the wall thickness of bushing 20 must be very thin, the internal diameter of rings 42 may be smaller than the diameter of the shaft 12 and grooves may be disposed within shaft 12 to prevent contact between shaft 12 and rings 42.

Figure 7:
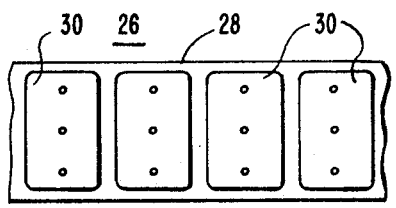
FIG. 7 is an end-sectional view of a ball bearing arrangement in accordance with the present invention.

FIG. 7 shows another particular arrangement in accordance with the invention in the form of a resilient mounting assembly for a ball bearing. In the configuration of FIG. 7, a spring assembly 26, which may be any one of the configurations of FIGS. 4, 5 and 6, is shown in a generally cylindrical configuration positioned between a journal bearing housing 16 and an outer support member of bearing 42, in this case the outer race 21. The bearing 42 is shown in conventional fashion as comprising an outer race 21 and an inner race 23 and a plurality of balls 44 positioned therebetween. The shaft 12 is inserted inside the inner race 23. As with the fluid film lubricated bearing arrangements of FIGS. 2 and 3, the resilient mount of the ball bearing structure of FIG. 7 advantageously provides an improved bearing structure with reduced instability due to synchronous and half-frequency whirl and an improvement in the range of speeds over which the bearing may be operated before encountering whirl instability.

Although there have been described hereinabove particular arrangements of resiliently mounted bearings in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A bearing arrangement comprising a rotatable shaft, a housing having an aperture extending therein to receive the rotatable shaft; a generally circular bearing element providing an outer bearing surface disposed about the shaft within the housing aperture; and a spring assembly disposed circumferentially between the element and the walls of the housing aperture, said spring assembly being comprised of a base portion having a generally cylindrical configuration and presenting a continuous cylindrical surface to the circular bearing element and radially spaced apart therefrom to permit rotation relative thereto, and a plurality of resilient elements extending between the base portion and the walls of the housing aperture to present a non-linear resiliency to the bearing element in a radial direction.

2. A bearing arrangement in accordance with claim 1 including a ball bearing positioned on the rotatable shaft and having a plurality of balls disposed between inner and outer bearing races, the outer bearing race constituting said circular bearing element.

3. A bearing arrangement in accordance with claim 1 wherein the bearing element comprises a bushing disposed about the rotatable shaft within the housing aperture to provide a fluid film lubricated bearing structure, said bushing having an inner diameter which is larger than the diameter of the rotatable shaft to permit rotation of the bushing relative to the shaft.

4. A bearing device in accordance with claim 1 wherein said spring assembly consists of an integral piece of resilient metal fabricated from a substantially flat strip.

5. A bearing device in accordance with claim 1 further including a pair of retaining rings respectively adjacent opposite ends of the bushing, each of said retaining rings being mounted within a circular recess in the wall of the housing aperture.

6. In a bearing having a rotatable shaft received within an aperture in a housing and a generally circular bearing member disposed about the shaft and within the housing aperture, a spring assembly disposed between the walls of the housing aperture and the generally circular bearing member and comprising an integral piece of resilient material formable in a generally cylindrical configuration radially spaced apart from the generally circular bearing member and having means defining groups of slots in said integral piece of material, said groups being substantially equally spaced about the circumference of the cylindrical configuration, each of said groups of slots including a pair of slots axially displaced from one another relative to the central axis of the cylindrical configuration and a third slot joining said pair of slots approximately at their mid points, each group of slots defining a pair of said resilient elements, and each of said resilient elements extending outwardly from the cylindrical configuration and lying substantially within a plane tangent thereto.

7. In a bearing having a rotatable shaft received within an aperture in a housing and a generally circular bearing member disposed about the shaft and within the housing aperture, a spring assembly disposed between the walls of the housing aperture and the generally circular bearing member and comprising an integral piece of resilient material formable in a generally cylindrical configuration radially spaced apart from the generally circular bearing member and having means defining groups of slots in said integral piece of material, said groups being substantially equally spaced about the circumference of the cylindrical configuration, each of said groups of slots including a first pair of slots axially displaced from one another relative to the central axis of the cylindrical configuration and a second pair of slots extending substantially axially from opposite edges of the cylindrical configuration along an axis parallel to the central axis and joining respective ones of the first pair of slots approximately at their mid points, each group of slots defining two pairs of said resilient elements, and each of said resilient elements extending outwardly from the cylindrical configuration and lying substantially within a plane tangent thereto.

8. In a bearing having a rotatable shaft received within an aperture in a housing and a generally circular bearing member disposed about the shaft and within the housing aperture, a spring assembly disposed between the walls of the housing aperture and the generally circular bearing member and comprising a strip of resilient material formable in a generally cylindrical configuration radially spaced apart from the generally circular bearing member, and a plurality of segments of similar material substantially equally spaced along said strip, each segment being affixed to the strip along a central line transverse to the strip, so that each of said segments extends outwardly from the cylindrical configuration and lies substantially within a plane tangent thereto.

9. A resiliently mounted hydrodynamic journal bearing comprising a rotatable shaft, said shaft having a uniform cross-section along at least an axial portion thereof, a housing having an aperture extending therethrough to receive the axial portion of uniform cross-section of the rotatable shaft, said aperture having a uniform circular cross-section and a diameter larger than the diameter of the portion of the rotatable shaft therein, a bushing disposed about the rotatable shaft within the housing aperture, said bushing comprising a hollow cylindrical element of uniform, relatively small thickness in a radial direction and having an internal diameter larger than the diameter of the rotatable shaft and an external diameter smaller than the diameter of the housing aperture, and a spring assembly disposed about the outside of the bushing and within the housing aperture, said spring assembly assuming a generally cylindrical configuration having a length in the direction of the central axis thereof substantially equal to the axial length of the bushing and an internal diameter larger than the external diameter of the bushing, said spring assembly including a plurality of resilient elements extending outwardly a uniform radial distance from the cylindrical configuration to bear against the interior wall of said housing.

10. A bearing in accordance with claim 9 further including a pair of retaining rings adjacent opposite ends of said bushing and spring assembly, each of said rings comprising a ring-shaped element having an internal diameter generally more than the diameter of the rotatable shaft and an external diameter greater than the diameter of the housing aperture, and each of said rings disposed at least partly within corresponding generally circular recesses lying within the wall of the housing aperture.

11. A bearing in accordance with claim 9 wherein said spring assembly comprises an integral piece of resilient metal assuming a generally cylindrical configuration and including means defining groups of slots in the integral piece of metal, said groups being substantially equally spaced about the circumference of the cylindrical configuration and defining said resilient elements, and each of said resilient elements lying substantially within a plane tangent to the cylinrical configuration.

12. A bearing in accordance with claim 9 wherein said spring assembly comprises a flexible strip of spring material and a plurality of regularly spaced segments of similar material affixed to said strip, each of said segments lying substantially within a plane tangent to said strip when the strip is positioned in a cylindrical configuration in said bearing.

References Cited

UNITED STATES PATENTS

| 1,126,971 | 2/1915 | Fowler | 308—147 |
| 2,622,930 | 12/1952 | Negri. | |
| 3,062,594 | 11/1962 | Bourguard | 308—121 |
| 1,422,780 | 7/1922 | Phelps et al. | 277—159 |
| 1,779,034 | 10/1930 | Dusinberre | 267—1.5 |
| 1,938,826 | 12/1933 | Frank | 277—149 X |
| 2,012,997 | 9/1935 | Junkers | 308—26 |
| 2,302,959 | 11/1942 | Johnson | 277—159 |
| 2,504,776 | 4/1950 | Woodfield et al. | 308—184 |
| 2,532,327 | 12/1950 | Parks | 308—184 |
| 2,602,009 | 7/1952 | Barlow et al. | 308—26 |
| 2,886,354 | 5/1959 | Bjorklund | 308—184 X |

FOREIGN PATENTS

| 599,544 | 6/1960 | Canada. |
| 65,482 | 8/1947 | Denmark. |
| 323,615 | 7/1920 | Germany. |
| 578,989 | 7/1946 | Great Britain. |
| 407,166 | 2/1910 | France. |

MARTIN P. SCHWADRON, Primary Examiner

FRANK SUSKO, Assistant Examiner

U.S. Cl. X.R.

308—184, 122